United States Patent

[11] 3,593,134

[72] Inventor Boris Abelevich Seliber
 ulitsa Rentgena, 15/13, kv. 53, Leningrad, U.S.S.R.
[21] Appl. No. 806,108
[22] Filed Mar. 11, 1969
[45] Patented July 13, 1971
[32] Priority Mar. 25, 1968
[33] U.S.S.R.
[31] 1228501

[54] MULTIMETER COMPRISING ILLUMINATING MEANS WITH A DIAPHRAGM
3 Claims, 6 Drawing Figs.

[52] U.S. Cl. .................................................. 324/115, 324/73, 324/97
[51] Int. Cl. ...................................................... G01r 15/12, G01r 13/38
[50] Field of Search .......................................... 324/115, 97, 96, 73

[56] References Cited
UNITED STATES PATENTS
2,107,936  2/1938  Gardner ........................ 324/97 X
2,258,952  10/1941  Hicks et al. .................... 324/97 X FOREIGN PATENTS
79,080  3/1950  Czechoslovakia ............ 324/97
191,838  1967  U.S.S.R. ....................... 324/97

Primary Examiner—Rudolph V. Rolinec
Assistant Examiner—Ernest F. Karlsen
Attorney—Waters, Roditi & Schwartz ABSTRACT: A multimeter having an optical pointer capable of being switched from one scale to another in compliance with the variable to be measured and comprising an illuminating assembly with a diaphragm and an active part or movement a with movable mirror intended for directing the optical pointer onto scales, wherein the illuminating assembly of the selector type is linked to a scale changer, provision being made for the scale changer to shift the light beam emerging from the aperture of the diaphragm into different positions corresponding to the selected scale and to the light beam to fall on the movable mirror of the active part on movement at different angles, depending upon the position selected.

MULTIMETER COMPRISING ILLUMINATING MEANS WITH A DIAPHRAGM

This invention is concerned with multimeters with optical pointer and movable mirror.

Known in the art are multimeters with an optical pointer, in which the optical pointer is switched over from one scale to another simultaneously with switching over the instrument from measuring one variable to another, said multimeters comprising an active part or movement with a movable mirror and an illuminator with a diaphragm. In the known instruments, provision is made for a diaphragm having one aperture which is illuminated by a lamp via a condenser. Interposed in the path of the light beam from the movable mirror to scales is an auxiliary mirror capable of being rotated to a plurality of preset positions simultaneously with switching the meter over from measuring one variable to another. This arrangement makes it possible to deflect the light beam and direct the optical pointer to an appropriate scale.

These multiscale meters with optical pointer have a disadvantage in that the optical pointer experiences cocking while travelling along scales, said cocking being due to the fact that auxiliary mirror rotation causes the optical pointer to fall on the scales at dissimilar angles. This disadvantage of the known meters complicates scale graduation, reduces the accuracy of reading, and affects adversely the appearance of the meters.

Another disadvantage of the known multimeters with optical pointer is associated with difficulties inherent in the mechanical linkage between the optical pointer switch and the measured variable-changing switch.

The aforesaid disadvantages are likely to be responsible for the limited application of the known multimeters.

It is, therefore, an object of the present invention to provide a multimeter in which optical pointer cocking will be obviated and mechanical linkages between the optical pointer switch and the measured variable-changing switch will be simplified.

This invention consists in a multimeter, in which an illuminating assembly of the selector type is linked to a scale changer so that scale changer actuation will cause the light beam emerging from the aperture of the diaphragm to be displaced to a position conforming to the selected scale and the fall on the movable mirror of the active part or movement of the meter at an angle that is specific for a given scale.

This arrangement is advantageous in that it makes it possible to obviate optical pointer cocking and to simultaneously simplify the linkage between the optical pointer switch and the measured variable-changing switch.

In one form of the present instrument, in the diaphragm provision is made for a plurality of apertures and the scale changer is of the electromagnetic type, wherein armatures of the electromagnet control the shutters of diaphragm apertures in such a manner that every position of the scale changer leaves only one aperture of the diaphragm open, said aperture corresponding to the scale selected.

In another form of the present instrument, the illuminating assembly incorporates a plurality of lamps disposed in opposition to appropriate diaphragm apertures and energized by the scale changer so that for each position of the scale changer there lights up a particular lamp.

The present invention is illustrated hereinbelow by the description of exemplary embodiments thereof with reference to the accompanying drawings, wherein:

FIG. 1 shows a multimeter with optical pointer and selector;

FIG. 2 presents one form of embodying the illuminating assembly of the meter of FIG. 1;

FIGS. 3 and 4 present various forms of circuitry employed in the selector which switches over the optical pointer;

The present multimeter comprises casing 1 (FIG. 1) on whose face side 2 provision is made for four parallel scales 3, 4, 5 and 6 intended for taking the readings of voltage (V), current strength (A), resistance ($\Omega$), and capacitance ($\mu F$), respectively. The aforesaid scales are furnished with transparent, frosted-glass screens 7, 8, 9 and 10, respectively.

Figure 1:
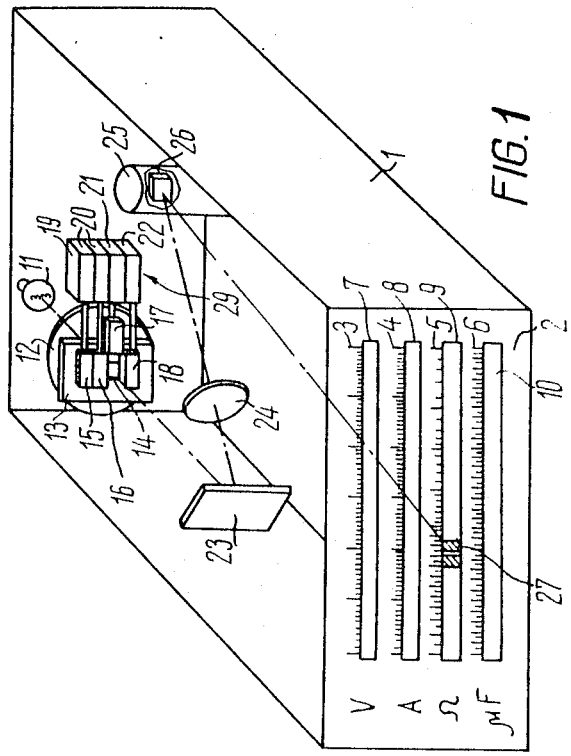

Casing 1 houses illuminating lamp 11, condenser 12, and diaphragm 13 with apertures 14 (shown in FIG. 1 is only one aperture). Disposed ahead of the apertures (slits) are shutters 15, 16, 17 and 18 linked to the armature of electromagnets 19, 20, 21 and 22, respectively. The optical system of the instrument incorporates fixed flat mirror 23, object lens 24 and active part or movement 25 with movable mirror 26. Said optical system shapes and projects optical pointer 27 onto one of frosted-glass screens 7, 8, 9 and 10.

Figure 3:
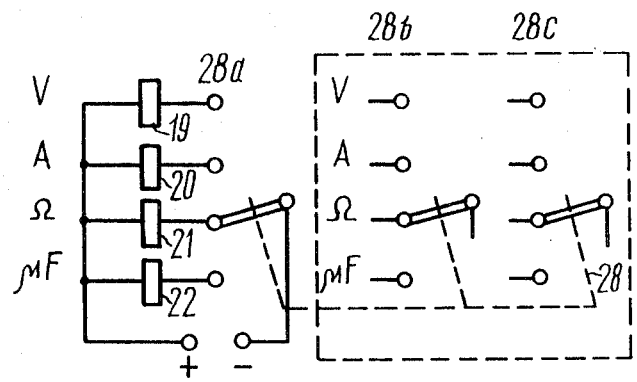

The windings of electromagnets 19, 20, 21 and 22 are consecutively coupled by means of switch 28a(FIG. 3) to a DC power source (not shown in the drawing). Electromagnets 19, 20, 21 and 22 in conjunction with shutters 15, 16, 17 and 18 and switch 28a constitute selector 29 (FIG. 1), which provides for projecting the optical pointer on a selected scale. Switch 28a(FIG. 3) is mechanically linked to measured variable-changing switches 28b and 28c, which serve for changing over the measured variables. Switches 28a, 28b, and 28c may be made in the form of single switch 28 having several plates. Said multiway switch 28 may be mounted outside casing 1 in any site of the measuring equipment used.

The light flux from lamp 11 (FIG. 1) is collected by condenser 12 and directed to diaphragm 13 so as to illuminate all apertures 14 provided therein. With switch 28 placed, say, in the position "$\Omega$," electromagnet 21 will be energized and shutter 17 will, accordingly, be opened. The light beam that passes through an opened aperture of the plurality of apertures 14 of diaphragm 13 is reflected by fixed mirror 23, which directs the light beam via object lens 24 to movable mirror 26. Upon reflection from mirror 26, the light beam forms on transparent, frosted-glass screen 9 optical pointer 27, which, as a result of mirror 26 rotation, will travel along scale 5 and indicate the magnitude of the measured variable, viz., resistance ($\Omega$).

Where it is desired to measure, say, the current strength, switch 28 should be set in the position "A," which action deenergizes magnet 21, thereby causing shutter 17 to close the previously opened aperture, and simultaneously energizes electromagnet 20, which actuates shutter 16 in order to open the desired aperture in the plurality of apertures 14.

The aforesaid sequence of operations results in shifting optical pointer 27 from screen 9 to screen 8 and causing said pointer to travel along the scale "A" to indicate the magnitude of the current strength being measured.

Figure 2:
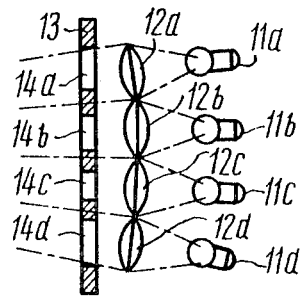

In another form of embodying the present invention, the illuminating assembly incorporates lamps 11a, 11b, 11c and 11d (FIG. 2) and condensers 12a, 12b, 12c and 12d, each lamp-condenser pair 11a—12a, etc. being intended to illuminate only one aperture 14a, 14b, 14c and 14d, respectively.

Figure 4:
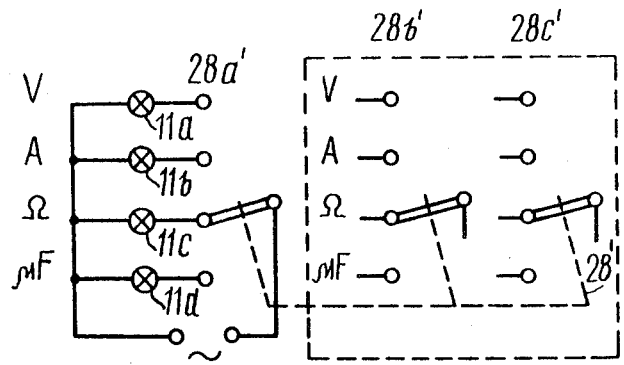

To switch over optical pointer 27 from one scale to another, use is made of switch section 28a (FIG. 4) of switch 28.

The herein described meter is furnished with four scales, but it will be apparent to those skilled in the art that recourse may be had to a greater or smaller number of the scales graduated so as to indicate the magnitude of one or a plurality of measured variables.

Figure 5:
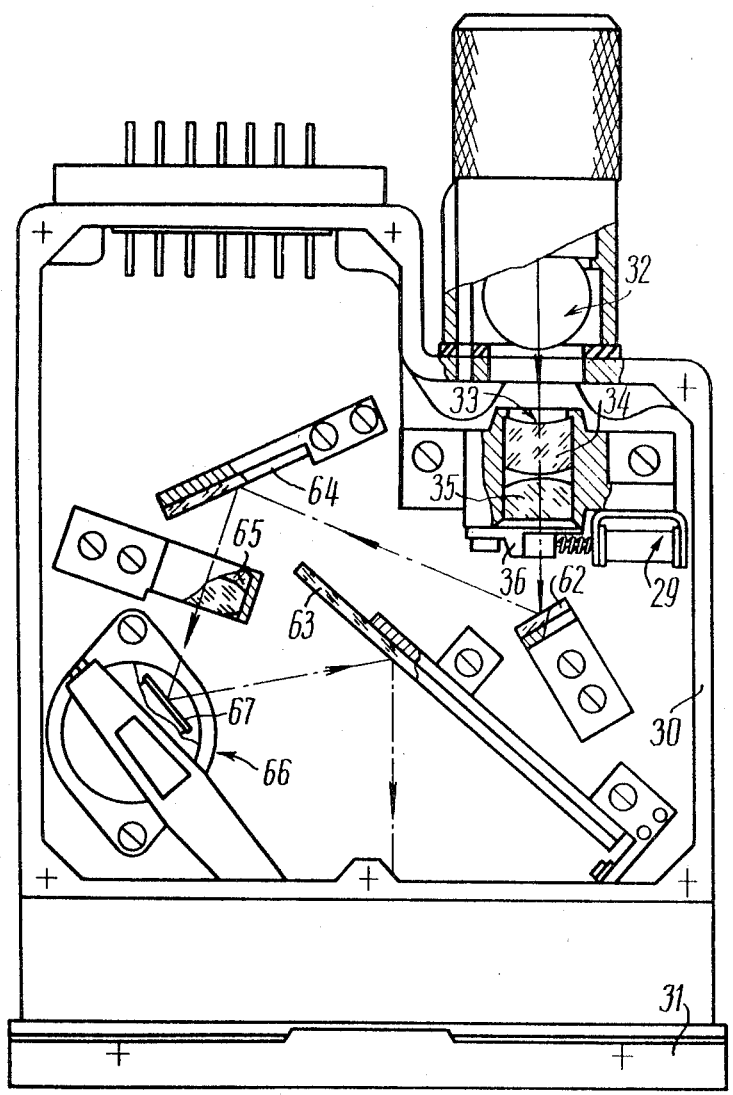
FIG. 5 is a plan view of the multimeter with optical pointer and selector.

Shown in FIG. 5 is an exemplary embodiment of the measuring instrument having five scales.

The instrument is contained in appropriately shaped casing 30 with scales (not shown in the drawing) disposed on front side 31 of said casing. Housed in casing 30 are illuminating lamp 32 and condenser 33, which incorporates lenses 34, 35 and diaphragm 36.

Figure 6:
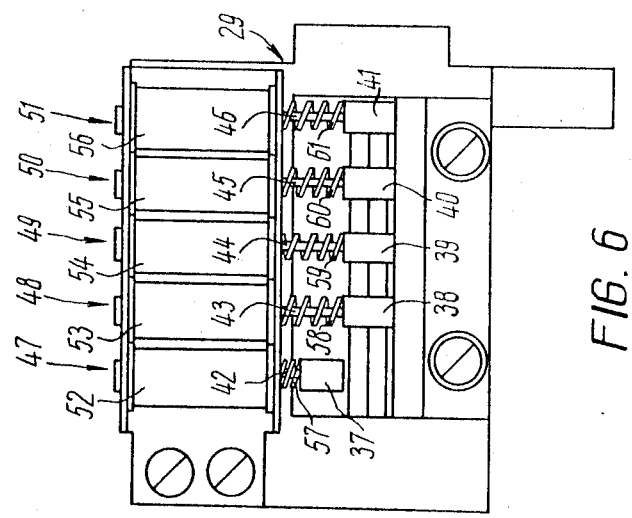
FIG. 6 shows a form of the selector of the electromagnetic type.

Disposed ahead of diaphragm 36 are shutters 37, 38, 39, 40 and 41 (FIG. 6) linked with armatures 42, 43, 44, 45 and 46 of electromagnets 47, 48, 49, 50 and 51, respectively. In said electromagnets, provision is made for windings 52, 53, 54, 55 and 56 and springs 57, 58, 59, 60 and 61, respectively.

The optical system of the instrument, which also incorporates fixed mirrors 62 (FIG. 5), 63 and 64, object lens 65, and active part or movement 66 with movable mirror 67, shapes and projects an optical pointer (not shown in the drawing) onto an appropriate scale.

The forms, in which the present invention may be realized, make it possible to substitute mechanical linkages for electric coupling, thereby making the meter design considerably less complicated and providing for the possibility of locating the switch in practically any site of an elaborate measuring system and at a considerable distance from the multimeter.

The optical pointer shaped by the optical system disclosed hereinabove experiences no cocking when being switched over from one scale to another or while travelling along a scale, thereby facilitating scale graduation, enhancing the accuracy of readings, and improving the appearance of the instrument scales.

When use is made of the optical system form involving one lamp-condenser pair and several electromagnets linked to shutters (FIGS. 1 and 3), it is generally mandatory to employ a rectifier for powering the windings of the electromagnets. However, a compact rectifier can easily be built into the instrument casing.

In another form of the optical system, recourse is had to a plurality of lamp-condenser pairs (FIGS. 2 and 4), but in this instance the rectifier can be dispensed with.

It should be borne in mind that the forms of the present instrument, as described above with reference to the accompanying drawings, relate to preferred embodiments as regards the shape, size and disposition of separate components of the instrument, so that various modifications and alterations can be practiced without deviating from the spirit and scope of the present invention as disclosed in the appended claims.

I claim:

1. A multiscale meter with a light spot formed at the end of a light beam, said light spot traveling from one scale to another according to a selected value being measured, comprising an instrument movement, a switching means to connect the selected value being measured to said instrument movement, a movable mirror attached to said instrument movement so that the angle of rotation of the mirror depends on the value being measured, a plurality of scales graduated in terms of the values being measured, an illuminating means, a diaphragm with an aperture to let the light beam pass from said illuminating means onto the movable mirror so that said mirror deflects the light beam onto one of said scales in the form of a light spot, selecting means associated with said switching means and displacing the aperture in said diaphragm relative to said mirror parallel to its axis of rotation so that by switching the light spot from one scale to another, the angles of incidence of the light beam onto said movable mirror and onto the respective scale will both simultaneously change and be equal to each other.

2. A multiscale meter with a light spot formed at the end of a light beam, said light spot traveling from one scale to another according to a selected value being measured, comprising an instrument movement, a switching means to connect the selected value being measured to said instrument movement, a movable mirror, said movable mirror attached to said instrument movement so that the angle of rotation of the mirror depends on the value being measured, a plurality of scales graduated in terms of the values being measured, an illuminating means, a diaphragm having a plurality of apertures arranged in a row parallel to the axis of rotation of said mirror, a plurality of shutters placed near said apertures, with each of said plurality of shutters being associated with a respective aperture, electromagnetic means coupled with said switching means and having a plurality of windings and armatures cooperating with the shutters, said electromagnetic means displacing said shutters so that only one aperture is open at a time, the switching over of the light spot from one scale to another causing the angles of incidence of the light beam onto said movable mirror and onto the respective scale to both simultaneously change and be equal to each other.

3. A multiscale meter with a light spot formed at the end of a light beam traveling from one scale to another according to a selected value being measured, comprising an instrument movement, a switching means to connect the selected value being measured to said instrument movement, a movable mirror attached to said instrument movement so that the angle of rotation of the mirror depends on the value being measured, a plurality of scales graduated in terms of the values being measured, a plurality of illuminators, a diaphragm having a plurality of apertures arranged in a row parallel to the axis of rotation of said movable mirror, each aperture corresponding to one illuminator, a selecting means cooperating with said switching means so that only one illuminator is switched on at a time, the switching over of the light spot from one scale to another causing the angles of incidence of the light beam onto said movable mirror and onto the respective scale to both simultaneously change and be equal to each other.